United States Patent [19]

Morris et al.

[11] Patent Number: 4,827,162
[45] Date of Patent: May 2, 1989

[54] CONTROLLED DRAG FOR MAGNET ACTUATOR

[75] Inventors: Frank I. Morris, San Jose; Whitney B. Kroetz, Sunnyvale, both of Calif.

[73] Assignee: Unisys Corp., Detroit, Mich.

[21] Appl. No.: 20,933

[22] Filed: Mar. 2, 1987

[51] Int. Cl.⁴ ............... H02K 49/04; H01L 41/02; H04R 9/02
[52] U.S. Cl. ............................. 310/13; 310/105; 360/106
[58] Field of Search ............... 310/12, 13, 15, 105; 360/97, 105, 106, 109

[56] References Cited

U.S. PATENT DOCUMENTS

| | | |
|---|---|---|
| 3,617,673 | 11/1971 | Helms . |
| 3,666,977 | 5/1972 | Helms et al. . |
| 3,827,081 | 7/1974 | Prieur . |
| 3,922,501 | 11/1975 | Yamamuro ............... 381/197 |
| 3,984,706 | 10/1976 | Inouye ..................... 310/12 |
| 4,287,445 | 9/1981 | Lienau ..................... 360/106 |

Primary Examiner—Patrick R. Salce
Assistant Examiner—D. L. Rebsch
Attorney, Agent, or Firm—John J. McCormack

[57] ABSTRACT

A disk drive actuator including automatic eddy-current braking capability, enhanced by simple modifications of coil-mount structure, such as split damping ring DR and spaced-rib array, this array shown for example in FIG. 12 (see DR-R).

12 Claims, 7 Drawing Sheets

CONTROLLED DRAG FOR MAGNET ACTUATOR

This invention relates to electromagnetic actuator assemblies and in particular to novel improved linear voice-coil assemblies adapted for reciprocating magnetic transducer means relative to magnetic recording surfaces.

Workers know that computers today commonly employ magnetic disk files for recording and storing data. Disk files have the advantage of facilitating data transfer at randomly selected address locations (tracks) and without need for a "serial seek" as with magnetic tape. Such transducers must be reciprocated very rapidly between selected address locations (tracks) with high precision; i.e., the system must move a transducer between locations very quickly and with high positional accuracy between closely-spaced track addresses. This constraint becomes understandably tricky as track density increases.

Disk file systems commonly mount a transducer head on an arm carried by a block that is supported by a carriage. This carriage is usually mounted on tracks for reciprocation by an associated actuator. This invention is concerned with improving the efficiency of such actuators; and particularly with improving linear "voice-coil" positioners.

Known Positioners

The actuators commonly used with magnetic disk files are subject to some exacting requirements. For instance, these systems typically involve a stack of several magnetic disks, each with many hundreds of concentric recording tracks, with a head-carrying arm typically provided to access each pair of opposing disk surfaces. This arm will typically carry two to ten heads, each to be reciprocated over a stroke excursion of about one inch to position its heads adjacent a selected track. Thus, it will be appreciated that such applications require a high positioning accuracy together with very fast translation (to miniize access time—a significant portion of which is used for head positioning).

Since it is critically important for an actuator system to move a transducer very rapidly between data locations and do so with high positional accuracy between closely-spaced track addresses, this constraint becomes ever more burdensome as track density increases—as is presently the case. Fast access allows a computer to process data as fast as possible—computer time is so expensive that any significant delay over an extended period can inflate costs enormously. [Note: "transition time", during which heads are moved from track to track, is "dead time" insofar as data processing is concerned.]

The trend now is toward ever higher track density, with increased storage capacity and decreased access time. Of course, as track density rises, closer control over the actuator mechanism is necessary to position transducer heads accurately over any selected track, lest signals be recorded, or read, with too much distortion, and without proper amplitude control, etc. An object hereof is to improve control of head positioning.

Computer manufacturers typically set specifications that call for such inter-track movements within no more than a few milliseconds. Such high speed translation is most demanding on actuators; it postulates a powerful motor of relatively low mass (including carriage weight) and low translational friction. Another requirement for such head positioners is that they exhibit a relatively long stroke (several inches) in order to minimize the number of heads required per disk.

The prior art discloses many such positioner devices, including some intended for use in magnetic disk memory systems: e.g., see U.S. Pat. Nos. 3,135,880; 3,314,057; 3,619,673; 3,922,720; 4,001,889; 3,544,980; 3,646,536; 3,665,433; 3,666,977; 3,827,081; and 3,922,718 among others.

Voice Coil Motors

Workers in the art are familiar with linear magnetic actuators, especially those adapted for reciprocating magnetic transducers relative to magnetic disk surfaces or the like. Such an actuator is the well-known voice coil motor (VCM, or moving coil actuator arrangement). This structure will be recognized as comprising an E-shaped magnetic structure including a central core along which a moving coil is adapted to be movably mounted. "Working flux" circulates through the magnet, traverses a gap, between pole pieces and a core, and is intercepted by the coil. When the coil is energized with a prescribed electric current and cuts a certain flux (prescribed flux density B and current i in coil of length L yields certain force, $F=BLI$), it will be induced to move. The direction of motion will depend on the polarity of the current relative to the flux, as known in the art.

The "voice coil" motor (VCM) comprises a solenoid like those used to drive an audio speaker. In disk drives, magnetic read/write heads are commonly carried by a carriage driven by a VC motor including a mobile electric coil positioned in a magnetic field and fed by a current of selected intensity and polarity. This magnetic field is typically established by permanent magnet means disposed about the movable coil.

Such a VC linear positioner can exhibit certain disadvantages—for example: undesirably large mass and associated high power requirements; a great burden is placed upon the power requirements to provide maximum acceleration. Such VC actuators are not particularly efficient in converting electrical power. This invention is intended to improve power-efficiency and to control the performance of such VC positioners.

Such actuators commonly experience problems with "eddy currents". Eddy currents impress a "drag" on the actuator, retarding it with a magnitude proportional to velocity. A feature hereof is to enhance eddy current drag, so that it functions as a brake, during high velocity, reducing such to a safer level (e.g., from about 90+ ips to 70–75 ips); particularly by increasing structure resistance (e.g., with a gapped-ring and narrow-rib housing).

In accordance with one salient aspect of the present invention, such a transducer positioner is formed to exhibit braking eddy-current-drag (E-C drag) at unduly-high speeds.

Thus, one object of this invention is to provide the mentioned and other features and advantages. Another object is to teach the use of eddy-current to control positioning of heads in a disk drive. Another object is to provide head actuators for disk drives wherein braking eddy-current-drag is enhanced. Yet a further object is to teach the advantageous use of such transducer actuators in disk drive assemblies.

Another object is to provide a visco-elastic coupling of a coil-drum structure to a carrying structure. A further object is to do so using a thin bonding tape.

BRIEF DESCRIPTION OF THE DRAWINGS

The foregoing, and other related objects, features and advantages of the present invention will be better appreciated by workers as they become familiar with the following detailed description of presently preferred embodiments, these being considered in conjunction with the accompanying drawings, wherein like reference indicia denote like elements:

FIG. 5 is a schematic enlarged end view of two concentric ring members of FIG. 1; while

Eddy current drag:

Workers in the art are aware that such a voice coil motor is apt to experience eddy current effects. It would be evident that one will normally try to minimize such effects where possible; e.g., it can be serious to catastrophic to translate units like those discussed below at higher actuator velocities, without reducing velocity. What is not evident (now) is that in certain instances, one can simply adapt eddy-current drag to selectively help brake the actuator, e.g. only at "high speeds".

A general object herein is to enhance "eddy drag" at high actuator speed (e.g., above 55 to 60 ips), purposely increasing drag by simple structural changes.

FIGS. 1 to 4 indicate a particular embodiment of the subject invention, namely actuator (core unit) A, wherein eddy current effects are to be so controlled.

Figure 1:
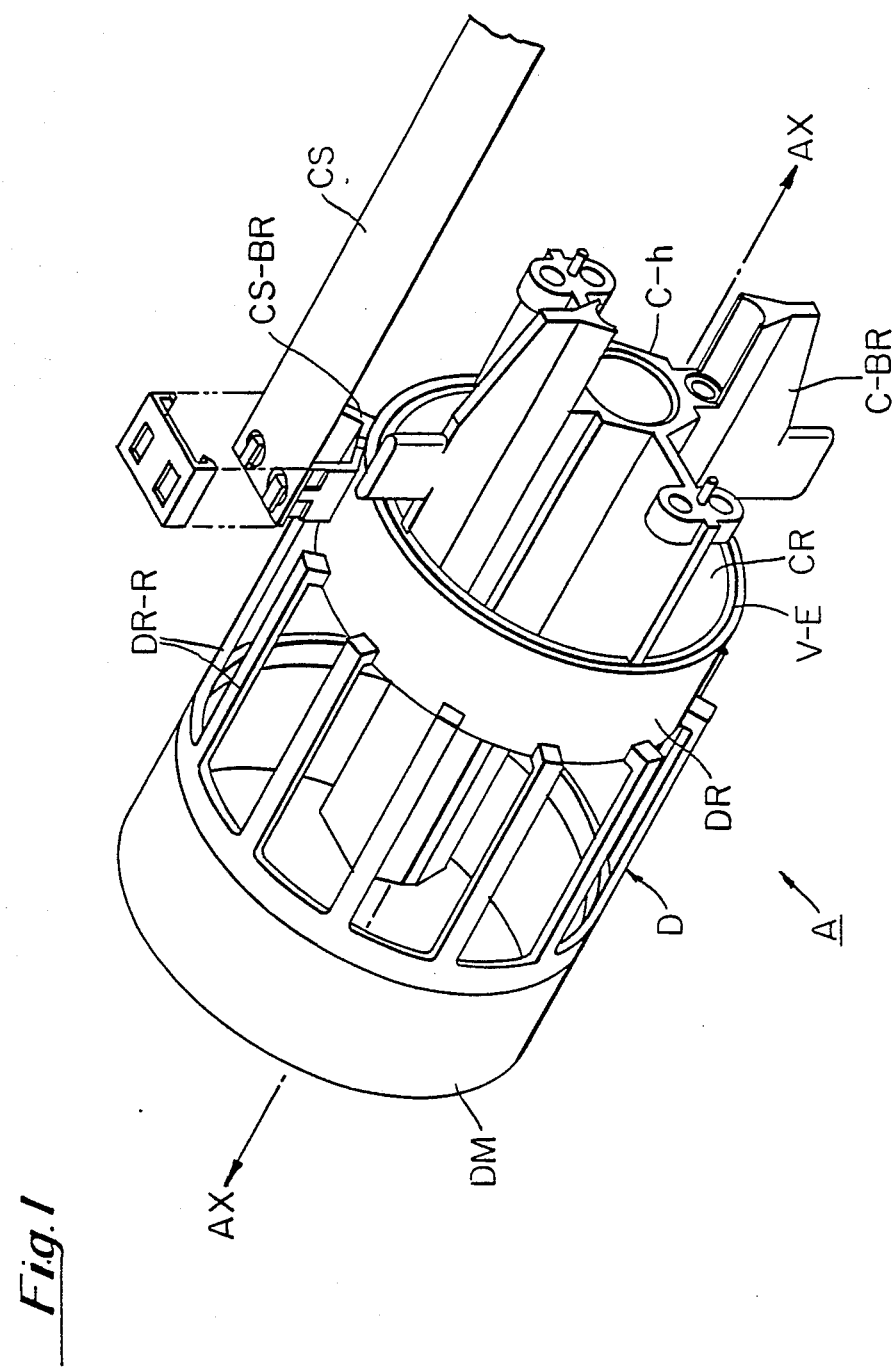
FIG. 1 is an isometric sketch of a preferred embodiment comprising a portion of a disk drive actuator.
Figure 2:
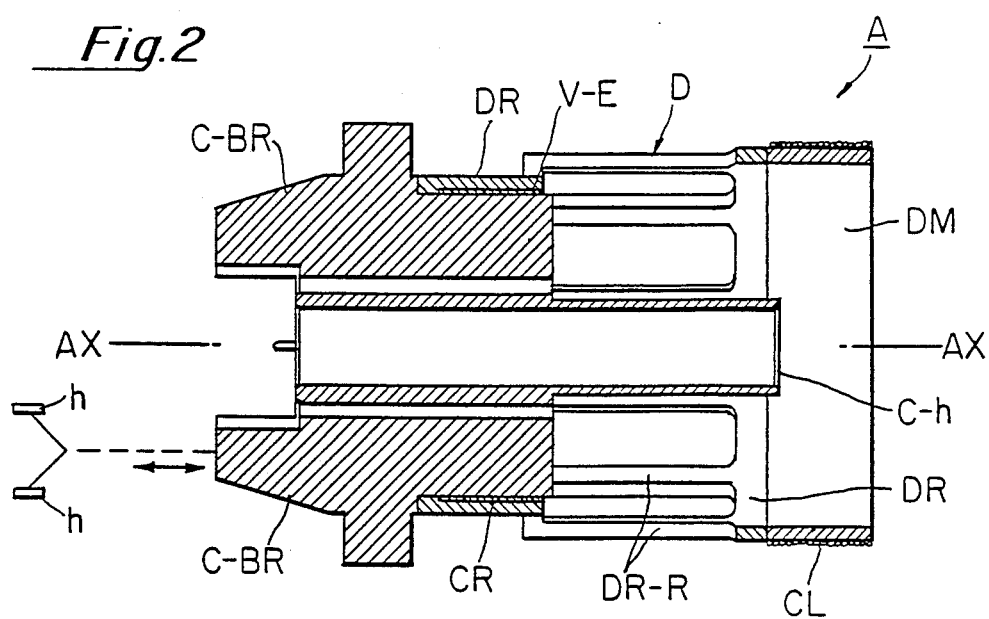
FIG. 2 is a simplified section through FIG. 1, with FIG. 3 showing an enlarged view of a portion thereof.
Figure 4:
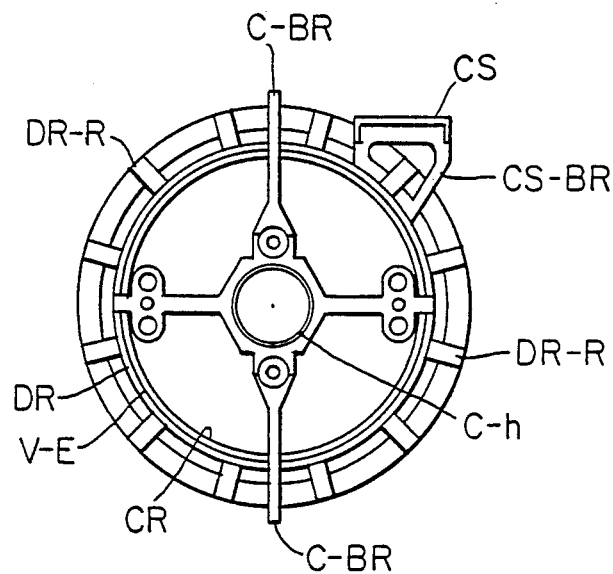
FIG. 4 is an end-view of FIG. 1.
Figure 3:
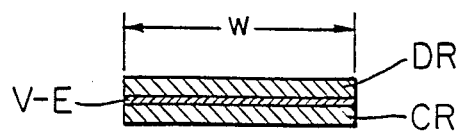
Figure 5:
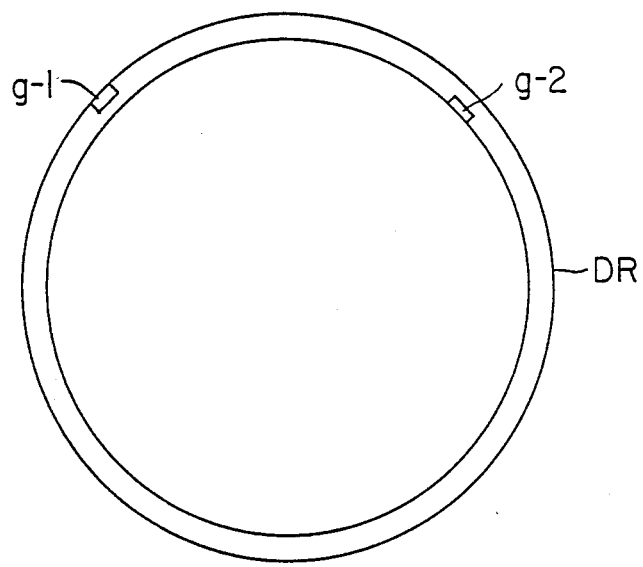

Referencing FIGS. 1, 2, and 4 particularly, actuator core unit A will be seen as comprising a central hub portion C-h understood as mounted on carriage means, (not shown) as known in the art, and adapted to be controllably translated along its axis, AX—AX, back and forth (see arrows by electromagnetic forces induced by application of current thru coil CL. Hub C-h will be understood as mounting four bracket members, C-BR, spaced equidistant thereabout (see also FIG. 5), with each such bracket C-BR understood as carrying its own actuator arm. Each arm, in turn, mounts read-/write head units as indicated schematically at h, h in FIG. 2, the unit (C-BR etc.) being understood as adapted to be translated linearly back and forth along direction AX—AX as indicated by the motion arrow. Encircling bracket C-BR and joined thereto, according to the invention, is a mounting ring CR. Ring CR is, in turn, coupled "visco-elastically" (as described below) to an outer "damping ring" member DR. Ring DR is a portion of a coil mounting drum D, whose flat aft portion DM carries the actuator coil CL. Connecting ring DR with coil-mount DM, according to the invention, are "rib means" DR-R spaced equally about the periphery of drum D.

Coil CL may be constructed in any known fashion, for instance of insulated windings wound closely around drum surface DM, with the current-input ends thereof led across one of the ribs DR-R to a resilient strap-conductor means CS mounted on ring DR. Strap CS is connectable at its opposite end to a current input plug as known in the art. Strap means CS may be mounted on ring DR via an associated bracket CS-BR as seen best in FIG. 5 and known in the art. Hub C-h and bracket C-BR may be comprised of any light rigid nonmagnetic metal such as an aluminum alloy, with Co-,Cr surface, while drum D is preferably composed of aluminum, or like nonmagnetic metal.

Damping Ring DR:

According to one salient feature, damping ring (damping collar) DR is given a prescribed width W (see FIG. 3) and is interrupted, across its width, by a slit with a prescribed gap g-1 (FIG. 5) adapted to increase resistance and increase eddy current brake force during high-velocity actuation (when coil CL is interacting with its outer magnets, not shown here, but understood in the art). Ring DR need only be thick enough to rigidly hold its shape. For instance, a 145 gm, 0.1–0.2 watt actuator like that depicted here is expected to reciprocate the unit about 1.2 inches (axially along AX—AX) at from 40 to 60 ips, with a drum D about 2.5–3 inches long (DM about ¾ inches wide under CL). It will be found satisfactory to implement this with a ring DR about 2.02 inches in diameter and a gap g-1 about 0.04 inches long. Reduction in width W, or increase in length of gap g-1 will increase resistance and enhance the eddy-current braking.

Figure 11:
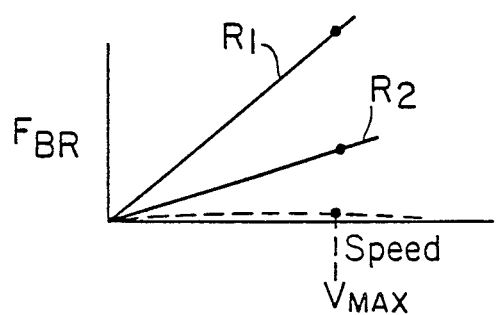
FIG. 11 is an idealized plot of eddy-current braking-force vs. actuator speed for structures like the above embodiment.

Workers will see that a prescribed summed resistance (See $R_1$, $R_2$, FIG. 11) can be arranged to provide eddy-brake force ($F_{BR}$) sufficient to reduce a certain undue velocity, $V_{max}$, FIG. 11, to a safer level. Thus, in FIG. 11 it will be understood that one summed resistance $R_2$ might give a certain braking force $F_1$, while a higher resistance $R_2$ would yield a larger braking force $F_2$. Setting of damping-gap g-1 and rib thickness can evidently be used for such control.

Ribs DR-R:

According to a related feature, the connect-area of drum D, connecting ring DR with coil-carrying-surface DM, is cut-out and implemented as a set of relatively thin, axially extending ribs DR-R, whose width and thickness (cross-sectional area) is thin enough to increase housing resistance (eddy-V) and so increase braking force at high actuation speeds (e.g., above 60 to 70 ips here; observed to reduce 90+ ips to 70–75 ips). To keep the drum short, and the resonance frequency high, one should reduce rib length as much as possible.

For instance, in the embodiment indicated in FIGS. 1–4, the width WR ... of ribs DR-R is approximately ⅛ inch; however, we have found that doubling this width to about ¼ inch can decrease eddy-current drag about 15% under moderate drive speeds (20 to 40 ips).

Also, we have noticed (as noted below) that joining drum DM to ring DR with such narrow ribs can attenuate the transfer of heat from coil CL to the visco-elastic couple VE between collar DR and ring CR, as discussed below. This can be very useful, since coil CL can get very hot, especially during "SEEK" operations (e.g., up to 180° F.).

In a sense, the above-described configuration of ring DR may be thought of as adapted for a "coarse adjustment" of eddy current value, whereas the rib configuration functions as a "fine adjustment".

In summary, workers will appreciate the advantages of controlling eddy-current to increase drag at operating speeds while maximizing it at higher speeds. They will also appreciate how this is done with such simple structural adjustments (of collar and ribs). The simplicity of this automatic braking control will be appreciated.

Visco-elastic couple V-E:

As another salient feature hereof, collar DR is coupled to a support ring CR by "visco-elastic" means acting as a selective "isolator" or "low-pass filter" to, in effect, efficiently couple only prescribed low frequency vibrations from drum D to the inner structure (C-H, C-BR etc., and especially to the arms and heads carried thereby) as known in the art.

Figure 6:
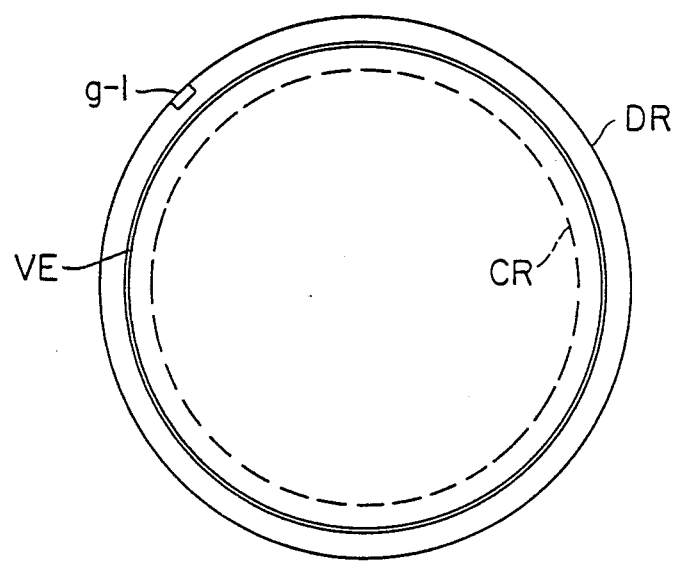
FIG. 6 shows the inner ring thereof, detached.

That is, rings DR, CR, together with visco-elastic couple V-E, will be seen as functioning to provide a selective damping ring or isolator which firmly couples low-frequency vibrations to the inner, head-carrying structure, but de-couples high-frequency vibration. This will be seen as especially important in avoiding damaging resonance frequencies associated with disk drives, such as are apt to occur at the higher frequencies. Thus, the V-E couple arrangement will be designed, especially, to decouple such resonant frequencies as understood in the art. Workers will understand that the couple V-E, (e.g., as seen in FIGS. 4 and 6) will be designed to be a relatively stiff, efficient force-transmitting "couple" at prescribed lower frequencies (in this case up to about 60 Khz), whereas at the higher frequencies (involving higher shear), couple V-E will be understood as functioning more as a resilient damping type material that, then, goes into shear and thus absorbs much of the high frequency, high-force vibrations from drum D. Workers will recognize that shear-damping is superior (e.g., to compression damping).

Couple V-E has been successfully implemented with for instance, a commercially available tape from 3M company of Minneapolis: "Adhesive Transfer Tape with Isotacs PS Additive, Y9473", having the width of rings DR, CR and about 10 mils thick (and exhibiting an elastomeric web with adhesive on both sides thereof). The undeformed 3-M tape is about 10 mils thick, but it is compressible to about 9 mils, as mentioned below, without becoming too rigid.

Such tape has been found to, very nicely, implement the invention and to give a visco-elastic couple very satisfactorily, showing surprising rigidity at low frequencies, yet good isolating resilience (shear) at higher frequencies. For instance, under a static bench test, it was found tobbodd ring DR to CR so rigidly as to resist about 100 lbs. of axial force therebetween without initiating more than minor shear; and even beyond this, its elastic limits were not exceeded. Workers will be surprised at how effectively such "bonding tape" can function in shear-damping of Vibrations. Heretofore it has been used only for its bonding characteristics. Of course, analogous bonding tapes etc., with little or no elastomeric properties will be nonpreferred (e.g., a tape with a perfectly rigid web).

Figure 7:
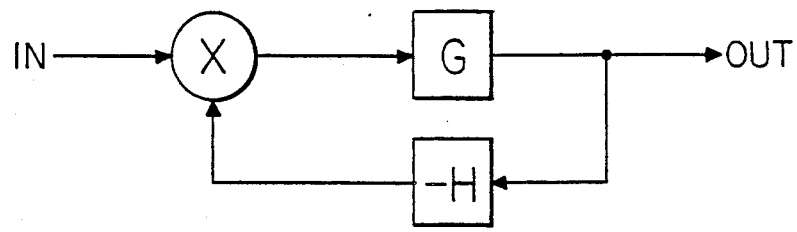
FIG. 7 is a block diagram of a feedback amplifier arrangement used to explain the function of the visco-elastic member in FIG. 1, while the plot in FIG. 8 illustrates this function in idealized fashion, with the plots in FIGS. 9A, 9B showing exemplary performance vs. frequency of this member (9A) vs. a control structure (9B)
Figure 8:
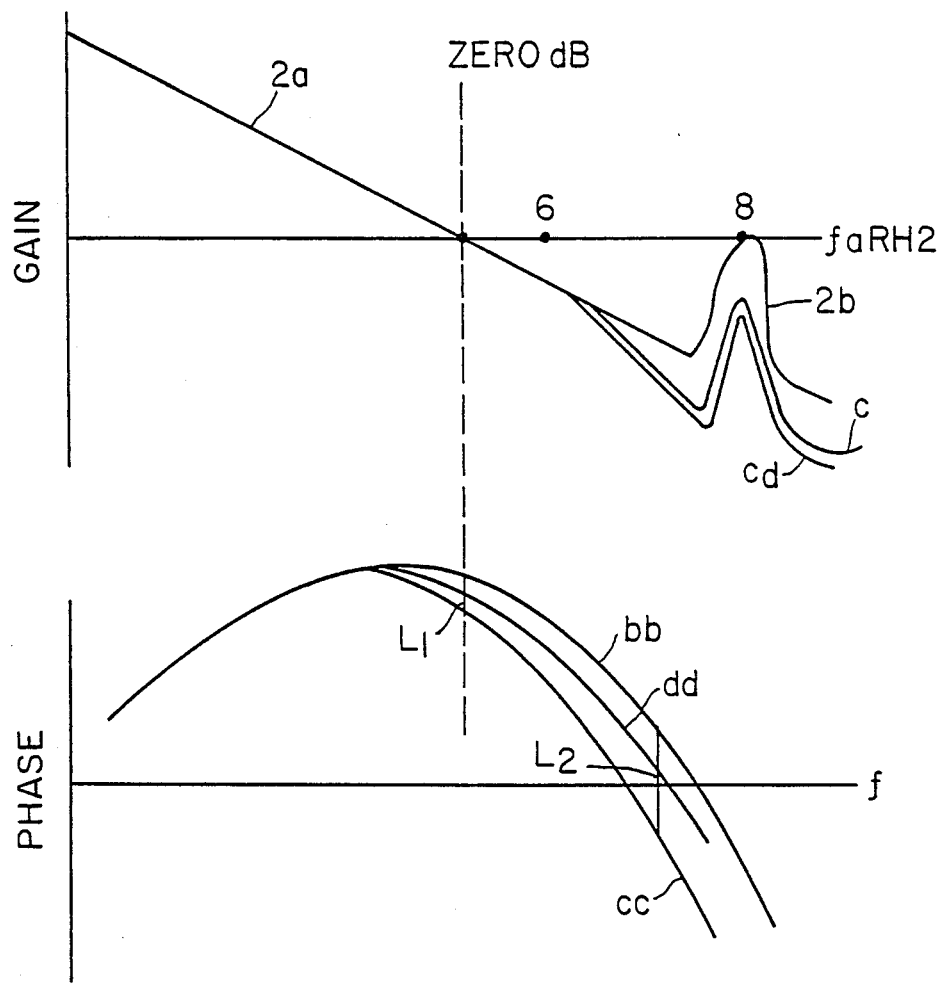

Filter performance, FIGS. 7 and 8:

The actuator servo system contemplated may be thought of as a "closed loop" servo of the type indicated in FIG. 7, wherein input is amplified by a forward-gain amplifier G with a feedback loop, including negative-feedback (minus H) as known in the art. The equivalent open loop system would simply comprise an amplifier of gain $G/1+GH$ as known in the art; where, as the product GH goes to $-1$, overall gain goes to infinity, and the system, of course, becomes unstable.

FIG. 8 is a plot of gain, and phase, vs. frequency, wherein it will be seen that the gain (slope $m=a$) is about $-2$ through a prescribed minimum frequency (here, about 6 KHZ), above which certain resonances may be expected, such as that shown at 8 KHZ. Workers will understand that a major goal of a system designer is to keep the system operating so that such massive resonances do not break (cross) the zero-dB axis. Such, of course, is the purpose and effect of our subject "filter", using visco-elastic means V-E as described above.

Figure 9A:
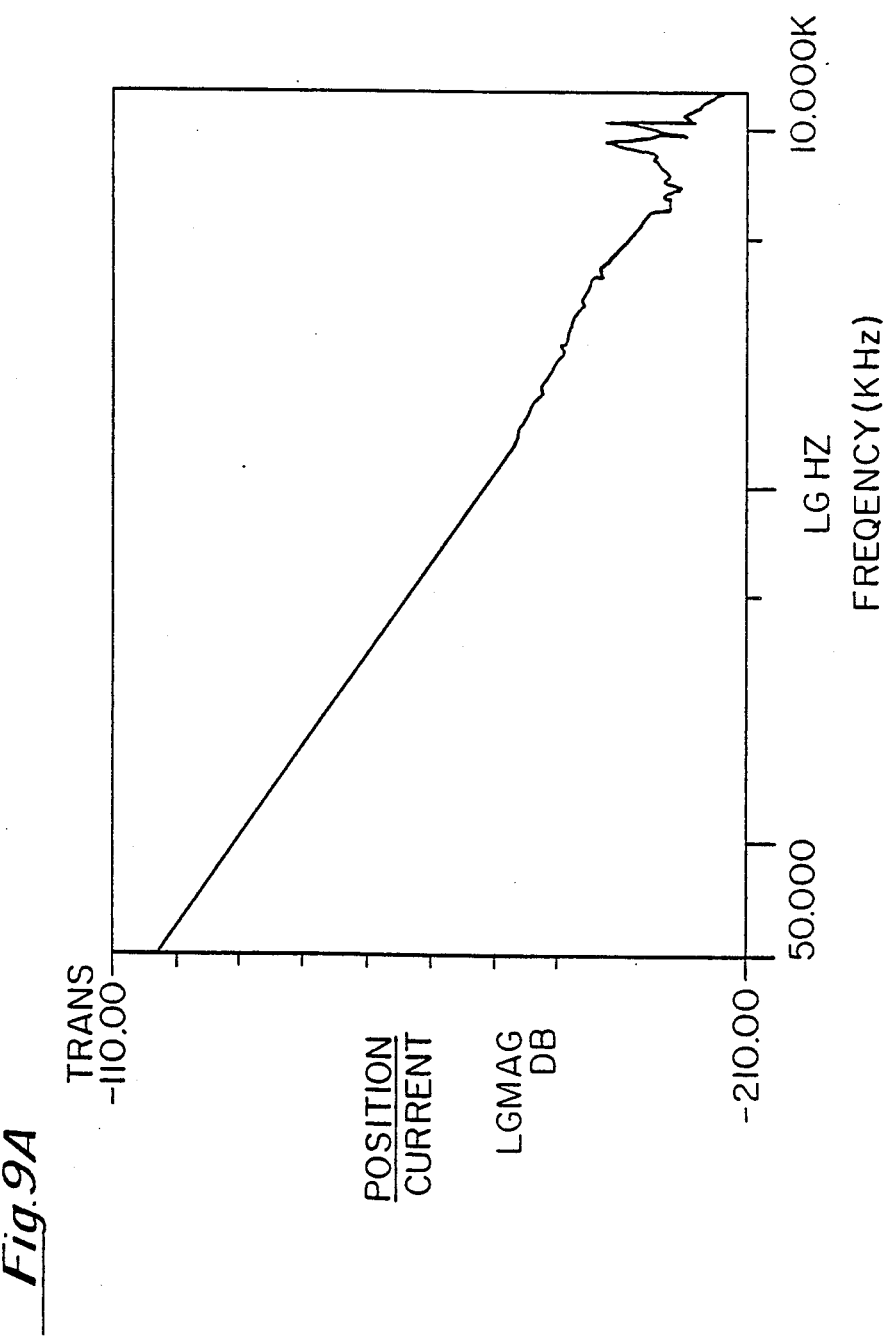
Figure 9B:
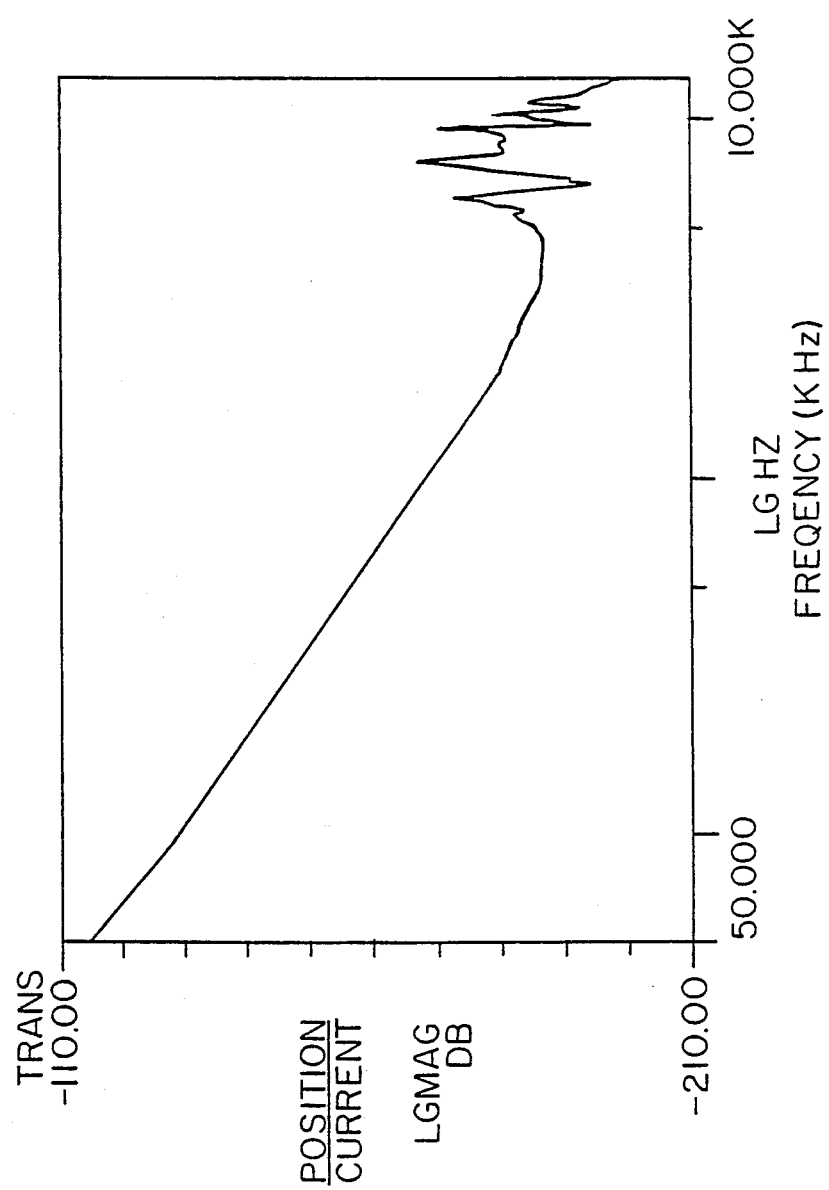
Figure 10:
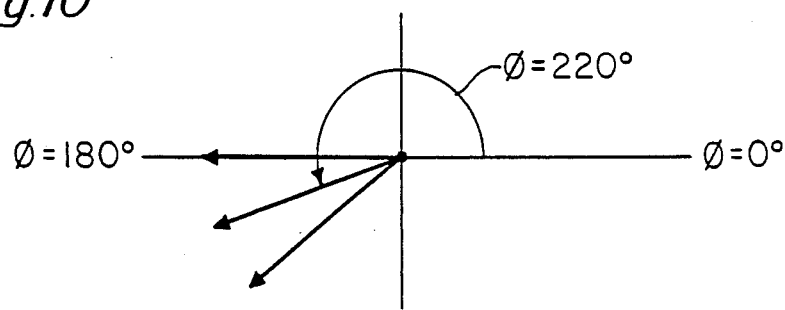
FIG. 10 shows an idealized plot of phase variance therefor.

The phase plot in FIG. 9 will be understood as normally proceeding along curve a (that is, without using the filter, or couple, V-E of the invention) and exhibit some resonant peaking as indicated at curve b. But when modified to use the subject invention (mechanical filter with couple V-E) it will follow curve d, i.e., the resonance peak will be suppressed; also the slope (dB/f) will be steeper (above 6 KHz). This is the kind of effect we have seen using couple V—E. [analogously, an electrical filter could possibly give a like effect—as idealized at curve c].

By comparison, prior art methods for handling such resonance problems have involved applying electrical feedback to the drive amplifier and derating it at resonance frequencies. This has involved some undesirable results, such as significant "loss of phase margin", something that must be kept to a minimum, as workers will understand. Such is illustrated schematically at curve cc in FIG. 8 where the "phase margin loss" will be seen as considerably more than that using the invention (e.g., loss $L_1$, at dB=o; $L_2$ at 7-8 KH$_z$).

Here, the problem is that there exist maximal resonances, giving $-1$ gain on the phase curve, for instance, with phase at 180°. It may be seen in FIG. 8 that at zero-dB, the phase margin is as indicated at $L_1$. One wants to minimize phase margin there (and elsewhere) so the system does not lose stability.

Ideally, couple V-E will effect the above; i.e., couple V-E is adequately rigid except above a prescribed "excess" vibrational force, whereupon it becomes somewhat elastic, attenuating shaking-amplitude, by going into elastic-shear.

Preferred assembly of couple V-E with rings:

According to another feature hereof, a simple preferred method of assembling this coupled damping structure is placing couple V-E and ring CR within damping ring DR as indicated schematically in FIG. 6. Here, it will be assumed that damping ring DR has an inner diameter of 1.944 inches while suspension ring CR has an outer diameter of 1.924 inches in its static unstressed state. This will leave a gap radially between CR and DR of about 10 mils (0.010 inches). In such a case we have found it advantageous to use a tape V-E the mentioned 3M #Y9473, which is about 10 mils tick (overall, web plus adhesive, both sides) in its static undeformed state and apply it to the inner side of ring DR as indicated schematically in FIG. 6. Next, one cuts a slit (e.g., about 40 mils wide) across ring CR so it may be compressed to have a reduced outer diameter, to be readily inserted within tape V-E. Thus, one compresses CR to close this slit and inserts CR within the confines of tape V-E (and with the CR slit g-2 mismatched, and out of registry with, slit g-1 on ring DR)—thereupon releasing CR so that its natural resilience will thrust it outwardly, compressing tape V-E so that its resilient web becomes thinner, yet is still resilient—from 10 mils to 9 mils thick—one should not compress it too much lest it lose requisite resilience. Of course, ring CR is selected to exhibit suitable resilient force against tape V-E (when so slit and compressed, then released) to so compress it lightly (e.g., not beyond about 6-7 mil thickness; else it will be too rigid).

It is further found that so slitting ring CR rather surprisingly does not impair the mentioned low-frequency/high-frequency performance of the unit in operation.

Results:

The couple V-E aforedescribed gives surprisingly good service, especially in light of its simplicity.

For instance, it was tested for comparative frequency response against a like control unit lacking the damping structure (V-E, CR on DR). In a vibration test, current was applied to excite coil CL and vibrate the unit across a wide range of frequencies. A Bruel and Kjeer accelerometer was mounted on the carriage (C-h, etc.), and Accelerometer output plotted, as in FIG. 9 B as a function of frequency for the "control" unit (no visco-elastic couple V-E) and likewise for the unit with couple V-E (see FIG. 9 A). The improvement is self-evident and surprising, especially in light of the relatively few simple modifications of actuator structure.

Modifications: Workers will appreciate that such results can be achieved with other like visco-elastic means which selectively couples (vibration) energy from coil structure to a sensitive structure connected thereto (like carriage C-h, etc., above)—except that at higher frequencies (e.g., resonance points), it goes into viscous shear and acts as a "filter" as afore described (e.g., attenuates resonance shaking). For instance, other kinds of, thin elastomeric webs held between vibrating members (like DR, CR) will occur to workers. And, in certain cases, when using a tape like that described, one will choose to insert several thicknesses between members, depending on space available, desired "filter characteristics", etc. And, in certain cases, one may create a "compound filter", coupling one or several tapes and inner rings inside a suspension ring like CR.

General Overview:

Workers in the art will recognize that such improved controlled-drag actuators with modified eddy-current configurations are considerably more efficient than prior art structures, with little or no inherent trade-offs. Such actuators exhibit desirable automatic "self-braking" at high frequencies; e.g., vs. "runaway vibration". Thus, such an actuator assembly will be viewed by workers as "better balanced", with improved linearity and stability and with more efficient flux-use. And it is interesting that eddy-current control features (e.g., ribs) can also function to affect the "filter" (e.g., protect tape vs. heat from coil, giving thermal isolation to V-E couple under collar DR), especially since the inter-rib spaces will admit cooling air. Workers will recognize that such an actuator design may be modified in various ways within the spirit of the overall concept.

Figure 12B:
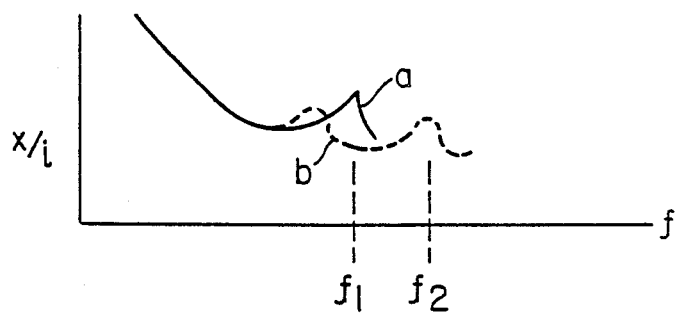
FIGS. 12A, 12B plot vibration vs. frequency for the embodiment vs. a control.
Figure 12A:
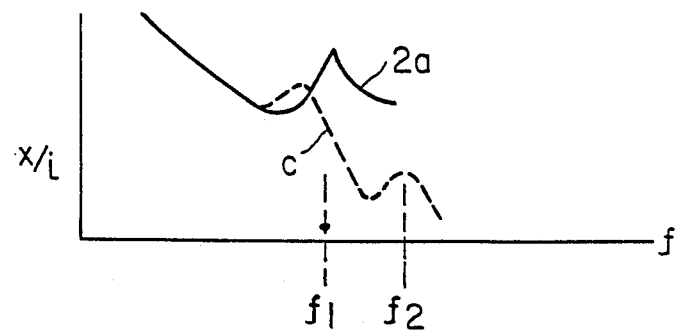

It should be emphasized that visco-elastic couple VE can, and must, be used as the sole join between driving and driven structures to achieve the desired effects. For instance we have tested the aforedescribed embodiment where VE is join between CR and DR against a like "control unit" (CU) where, in addition, the visco-elastic couple is essentially bypassed by rigid metal join-members, the tape being used, primarily only to bond CR to DR. FIGS. 12A, 12B offer a revealing comparison.

In FIG. 12A, vibration (excursion/current) is plotted vs. frequency for this V-E coupled embodiment (curve c) and for an "untouched" structure with no tape or the like between CR and DR, only a metal bond. The same is done in FIG. 12B, where control CU is so compared (curve b). The contrast is rather remarkable, making it quite evident how much is gained by simply using our couple V-E (e.g. tape described) as the sole join, rather than a mere supplement to a metal bond. For instance, note the steep "dive" taken by curve c circa $f=f_1$, how much this depresses the level of a following resonance a $f=f_2$—as apposed to curve b (control CU), when, though some "damping" may be inferred, there is nothing like the "roll-off"given by our embodiment. This is one reason why we stress that our couple VE, so, used as the sole join, performs a marked "isolation", or "filtering" function, and simultaneously increases "Q" or damps the resonances.

Moreover, workers should note that this "roll-off" effect is something that an analogous electrical filter means can provide. No analogous filter/device can simultaneously damp (broaden the "Q" of) the resonances. This makes couple V-E rather remarkably unique in effect, yielding not just attenuation but also a kind of isolation (roll-off) at selected high-frequencies.

Conclusion:

Workers will appreciate how aptly such controlled-drag actuators are combined to drive transducer assemblies for disk drive apparatus and the like. In particular it will be appreciated that such actuators can be used to improve the efficiency, power and the cost-effectiveness of a transducer actuator and to improve its flux-efficiency accordingly—something workers in the art will applaud. Workers will also appreciate that such "eddy-braking actuators" may be used to reciprocate other similar loads in related environments, such as stepper motors of rotary actuators.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to stable positioning of other transducers and related loads in similar systems and environments. For instance, related embodiments may be employed to position transducers for other forms of recording/reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A voice coil linear actuator including a prescribed drive coil structure mount on coil-mount means and arranged to be normally thrust thru magnetic flux at a prescribed range of speeds whereby appreciable eddy-current is generated on at least a portion of the coil-mount means, this portion including conductive connect means spaced from said coil structure and conductive bridge means connecting said connect means to said drive coil structure; said connect means including dielectric impedance means comprising gapped-ring means intersecting at least one eddy current path; and said bridge means being formed to exhibit high impedance in conducting eddy current, said bridge means comprising an array of identical spaced narrow metal ribs whose cross-section is sufficiently reduced to enhance eddy drag voltage at actuator speeds above said range.

2. A linear actuator including coil means mounted on metallic drum means this drum means exhibiting eddy-currents during electromagnetic excitation of the coil means, this drum means including impedance-enhancing grapped-ring means selected and arranged to enhance eddy-current to the point where it produces a drage voltage apt for reducing actuator speed above prescribed maximum speed, this gapped-ring means comprising a cylindrical ring portion having at least one impedance-enhancing dielectric gap thereacross.

3. The invention of claim 1 wherein the coil mount means is of nonmagnetic metal and cylindrical including a cylindrical bobbin portion and a cylindrical connect ring spaced therefrom, this ring including at least one dielectric gap of prescribed elevated impedance whereby to generate a prescribed braking eddy current at a prescribed actuator crash-speed, well above said normal range of speeds.

4. The invention of claim 3 wherein said bridge means comprises said array of ribs which are disposed equi-spaced about a cylindrical plane approximating the periphery of said bobbin, the rib cross-section being set to render a prescribed braking eddy current at said crash-speed.

5. The invention of claim 4 wherein the said coil mount means, including bobbin, ribs and ring portions, is composed of aluminium or an aluminum alloy.

6. The invention of claim 5 wherein said coil mount means is carried on a carriage structure disposed radially inward thereof, being coupled to said ring.

7. The invention of claim 6 wherein said impedance gap in said ring is an air gap.

8. The invention of claim 7 wherein said ring is somewhat smaller in diameter than said bobbin, and carries connector-current means selected and arranged to mount a flexible coil-current-conductor means.

9. A method of arranging a voice coil linear actuator to exhibit automatic eddy-current braking at a prescribed "excess-speed" well above its normal operating speed, this actuator comprising bobbin means, a drive coil wound on this bobbin means, and arranged to operate within prescribed magnetic flux; damping ring means spaced from the bobbin means, and cylindrical connect means joining said bobbin means to said ring means, this method comprising:
cutting thru the cross-section of said ring means to create one or several impedance gaps; such that when said actuator is traversing said flux at said "excess-speed" sufficient eddy-current will be generated to radically reduce actuator speed.

10. A method of arranging a voice coil linear actuator to exhibit automatic eddy-current braking at a prescribed "excess-speed" well above its normal operating speed, this actuator comprising bobbin means, a drive coil wound on this bobbin means, and arranged to operate within a prescribed magnetic flux; damping ring means spaced from the bobbin means, and cylindrical connect means joining said bobbin means to said ring means, this method comprising: Configuring said connect means as narrow ribs spaced equidistant about the bobbin means and exhibiting sufficiently narrow cross-section so that when said actuator is traversing said flux at said "excess-speed" sufficient eddy-current will be generated to radically reduce actuator speed.

11. The invention of claim 2 wherein said drum includes an elongated, somewhat-cylindrical portion extended axially from said coil means, this extended portion including a relieved portion therealong defined by an array of relatively narrow-cross section ribs separated from one another and providing eddy-current impedance-enhancement as well as increased resistance to heat flow.

12. The invention of claim 2 wherein said drum includes an elongate, somewhat-cylindrical portion extended axially from said coil means, this extended portion including a relieved portion therealong defined by an array of relatively narrow-cross section ribs separated from one another and providing eddy-current impedance-enhancement as well as increased resistance to heat flow; said ring portion being disposed at the drum end opposite said coil means, separated therefrom by said relieved portion.

* * * * *

UNITED STATES PATENT AND TRADEMARK OFFICE
CERTIFICATE OF CORRECTION

PATENT NO. : 4,827,162

DATED : May 2, 1989

INVENTOR(S) : Frank I. Morris and Whitney B. Kroetz

It is certified that error appears in the above-identified patent and that said Letters Patent is hereby corrected as shown below:

Col. 3, line 60, change, "Fig. 2" to --Fig. 4--;
Col. 5, line 55, change, "tobbodd" to --to bond--;
Col. 6, line 39, before, "Here" insert --Workers will recognize that--;
Col. 6, line 44, after, "stability" insert --as workers will appreciate--;
Col. 7, line 68, after, "is" insert --sole--.

Signed and Sealed this

Thirteenth Day of February, 1990

*Attest:*

JEFFREY M. SAMUELS

*Attesting Officer*     *Acting Commissioner of Patents and Trademarks*